INVENTORS R.L. HAYES
P.E. MOLLOY
R. M. SWANSON
BY Howard R Popper
ATTORNEY

CROSSBAR SWITCHING WITH SPECIAL SERVICE PROVISIONS

Filed July 29, 1966 12 Sheets-Sheet 3

July 29, 1969 R. L. HAYES ET AL 3,458,662

CROSSBAR SWITCHING WITH SPECIAL SERVICE PROVISIONS

Filed July 29, 1966 12 Sheets-Sheet 4

CROSSBAR SWITCHING WITH SPECIAL SERVICE PROVISIONS

CROSSBAR SWITCHING WITH SPECIAL SERVICE PROVISIONS

Filed July 29, 1966 12 Sheets-Sheet 12

United States Patent Office 3,458,662
Patented July 29, 1969

3,458,662
CROSSBAR SWITCHING WITH SPECIAL SERVICE PROVISIONS

Richard L. Hayes, Middletown Township, Monmouth County, Peter E. Molloy, Hazlet, and Richard M. Swanson, Holmdel Township, Monmouth County, N.J., assignors to Bell Telephone Laboratories, Incorporated, Murray Hill and Berkeley Heights, N.J., a corporation of New York Filed July 29, 1966, Ser. No. 568,967
Int. Cl. H04m 3/00, 3/50
U.S. Cl. 179—18 9 Claims

ABSTRACT OF THE DISCLOSURE

A stored program processor receives information from the registers. It can then direct a marker to establish a connection, or it can provide special service features. The system is designed to be added to an existing No. 5 crossbar office.

Figure 13:
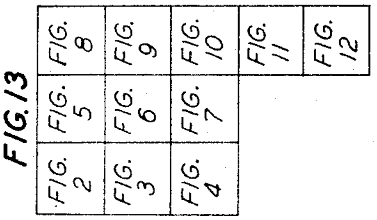

This invention relates to telephone switching systems and more particularly, to the provision of improved service features in marker-controlled switching systems.

The marker-controlled automatic telephone switching system of the type disclosed in A. J. Busch Patent 2,585,904 issued Feb. 19, 1952, has enjoyed widespread application in the telephone industry. The marker of this system is essentially a wired-logic translator and switching network controller which recognizes service requests from lines and trunks and determines the action required for the particular type of call. As a controller of the crossbar switching frames the marker is an extremely efficient apparatus and is uniquely equipped to perform the many special tests incident to the establishment of a switching linkage or cross-office communications channel. Accordingly, the marker continues to be satisfactory control media for providing basic telephone service. However, the nature of the telephone industry is such that demands for new services are constantly materializing and some of these new services, e.g., abbreviated dialing, temporary transfer, call-waiting signaling, add-on conferencing, impose requirements for increased translation, screening, and memory which cannot be met by existing, wired-logic markers. The nature of these services is such that circuitry for executing the associated logic and control functions cannot economically be provided on a per-line or even on a per-trunk basis. The need for the addition of new circuitry to existing telephone offices, moreover, comes at a time when the typical central office is already beset with a myriad of different special purpose trunks which require distinctive marker operations and which add to the maintenance and spare parts inventory control problem. It is also a fact that in the telephone business demands for new services materialize both in high density urban areas where the switch frames are likely to be approaching 100 percent utilization as well as in lower density areas where it may not be possible to effect an even traffic volume balance among the variety of services demanded. Further, regardless of the telephone density in any area, it would be intolerable to interrupt telephone service while whatever changes to the telephone plant dictated by these new service demands are being made.

Accordingly, it is an object of the present invention to improve telephone service by simplifying marker and trunk circuit operation while enabling the telephone office to provide new service features on an economical basis.

It is another object of the present invention to permit existing marker-controlled telephone switching offices to be modernized on an in-service basis.

The new services just mentioned have been made possible in all-electronic telephone offices of the type described, for example, in the Bell System Technical Journal issue of September 1964. That telephone office was able to offer the new services because of the ease with which stored program processors can provide translation, screening, memory and logical control functions. The network crosspoints of that electronic switching system were of the so-called ferreed type, a self-latching switch adapted to operate during the brief access time allowed by the processor. While the installation of such an electronic switching office can be justified both in new areas as well as in an area where the existing step-by-step or panel equipment is about to wear out, it would be economically unthinkable to replace a satisfactorily operating crossbar office merely to provide some new service features and electronic instead of relay circuitry. The problem, then, is how to accommodate electronic processing to an existing, marker-controlled switching system without wholesale replacement of the switching network.

In accordance with the principles of the present invention, a stored program electronic processor and an auxiliary link controlled by the processor are added to an existing marker-controlled telephone switching network. The conventional trunk circuits which normally appear in the switching network may be replaced (advantageously on an in-service basis) by simplified, electronically-scanned trunk circuits which, nevertheless, are capable of working with the existing crossbar markers. Distinctive or special trunk logic functions are provided by the processor temporarily connecting service logic circuits appearing in the auxiliary link to the new trunks. The trunk transmission and supervisory states (e.g., whether D.C. or bridged condition, sleeve open or grounded and switchhook conditions) are advantageously controlled by the stored program processor via the service logic circuits access through the auxiliary link rather than by the trunks themselves or by the processor directly.

The processor obtains access to certain information, normally directly provided to the conventional marker, by means of a register-processor interface circuit connected to each of the conventional register marker connector circuits. The normal connection between the register marker connector circuits and the marker is thus eliminated. The register-processor interface circuit is scanned and the contents thereof are delivered to the processor as required. When the processor is provided with the requisite amount of information and it determines that linkage through the switching network shall be set to, or extended from, a trunk circuit, it determines whether a new trunk or an old trunk shall be, or is, involved in the call being processed. If an old trunk is involved, the processor merely provides the marker with the same information that the latter would have received directly from the appropriate register marker connector circuit. The marker then proceeds to establish linkage to the trunk in the usual manner which depends, inter alia, upon whether the call is incoming, outgoing, or intraoffice. On the other hand, if a new trunk is available to be utilized on the call, or if one is already being utilized, as in the case of an incoming call, the processor will instruct the marker that a new trunk is involved, and, regardless of the type of call will, at the appropriate time, merely instruct the marker to establish a switching network linkage to the trunk. Moreover, this type of linkage will be set by the marker in the same way even though different types of new trunks may be employed in handling the different types of calls. This is achieved by the method of (1) having the processor establish a connection from the new trunk through the auxiliary link to one of the service logic circuits, (2) having the processor administer the distribution of signals to the service logic circuit to control the trunk supervisory or transmission state via the connection through the auxiliary link, (3) having the new trunk respond to this control extended to it over the auxiliary link by marking itself to the marker, and (4) having the processor furnish the marker with an indication that it is to set a cross-office linkage to the trunk which is marked.

Advantageously, an electronic processor may be equipped with a trunk status memory as well as marker status memory. After translation of the information furnished to the processor through the register-processor interface, an idle trunk for the route determined by translation may be selected without actually hunting over the trunk link frames. Similarly, when a marker is required to establish cross-office linkage to the desired trunk, an available marker may be assigned for this purpose. When the marker selected for use has completed the cross-office transmission path, the scanning of contacts of its "channel complete relay" indicates to the processor that the service logic circuit shall bze instructed to execute its logic functions with regard to the transmission path. When the logic function has been completed, the service logic circuit disconnects itself from the trunk circuit.

Accordingly, a feature of the present invention is a marker-controlled telephone switching system having a stored program electronic processor for administering the establishment of connections between simplified trunk circuits appearing in the marker-controlled switching network and service logic circuits which control the transmission and supervisory states of the simplified trunk circuits.

Another feature of the present invention is a marker-controlled telephone switching system wherein information normally provided to the marker through connector circuits is scanned at the connector circuits, translated by a stored program electronic processor and employed to activate the marker in the same manner regardless of the type of cross-office linkage to be established by the marker.

A feature of the present invention is a stored program control service logic circuit connectable to a trunk appearing in a marker-controlled switching network which controls the trunk to enable the marker to set a cross-office linkage without the need for trunk hunting.

Figure 1:
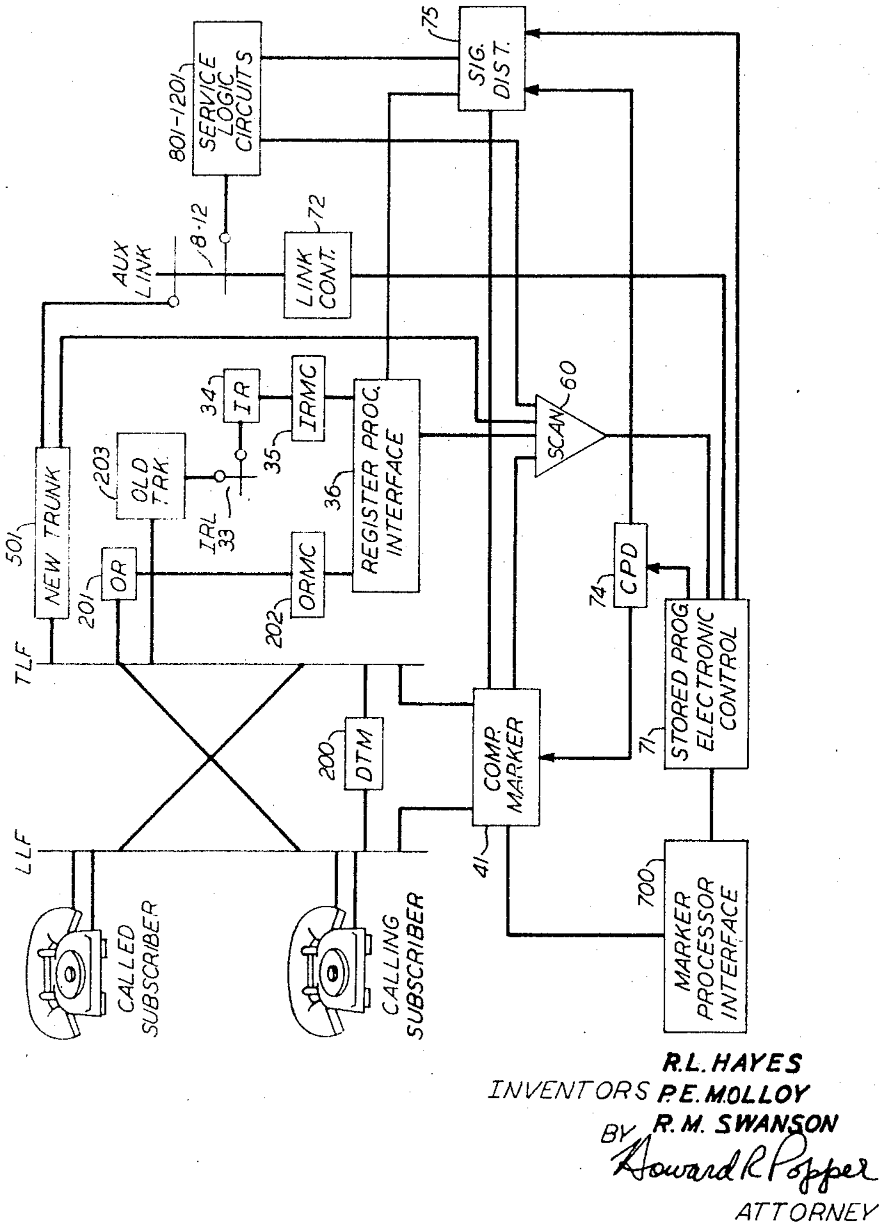

The foregoing and other objects and features may be more apparent by referring now to the drawing in which:

FIG. 1 shows a marker- controlled switching system exhibiting in block diagram form the controlling circuits of the present invention; and in which FIGS. 2 through 12, arranged as shown in FIG. 13, depict in more detailed form the circuitry of FIG. 1.

In FIG. 1, the various circuits have been given reference numerals whose first digit corresponds to the principal one of FIGS. 2 through 12 in which the circuit component is shown in more detail. FIG. 1 shows the telephones of called and calling subscribers which appear in the line link frame LLF of a typical marker-controlled crossbar switching telephone system. The trunk link frame TLF provides appearances for the usual originating register 201 and conventional trunk circuits such as old trunk 203. Cross-office connections from a calling subscriber's line link frame appearance to the originating register 201 are effected by means of dial tone marker 200 in the usual manner. In addition to the above-mentioned circuits appearing in the trunk link frame, or in lieu of the conventional trunk circuits such as old trunk 203, there is provided a plurality of simplified trunk circuits such as new trunk 501. New trunk 501 also has an appearance in auxiliary link 8–12 and connections are established between the new trunk and one of service logic circuits 801–1201 under the direction of stored program electronic processor 71.

The new trunk 501 is simplier than conventional trunk circuits because it merely need provide a facility for monitoring the "supervision" present at the incoming and outgoing ends of its transmission path and provide for transferring these ends to the control provided by the service logic circuits 801–1201. Because both ends of the transmission path are accessible to the service logic circuits through the auxiliary link, none of the trunks need contain the logic circuitry for placing it in its various signaling states nor need the trunk be equipped to decode the logic control signals transmitted to the trunks in the above-mentioned all-electronic system.

The information required to operate electronic processor 71 is provided thereto by scanner 60 which scans the new trunk circuits including trunk 501, the register-processor interface circuit 36, the service logic circuits 801–1201, and the completing marker 41. It will be noted that the usual connections between the marker 41 and the originating register marker connector 202 have been eliminated as have the connections between the incoming register marker connector 25 and the completing marker. While in FIG. 1 only one line link and trunk link frame, one completing marker, and one only of the register and various trunk circuits appearing in the trunk link frame have been shown for simplicity, it will be appreciated that an actual telephone office will have a plurality of such apparatus. Thus, a plurality of completing markers 41 will normally serve a group of line and trunk link frames. When one of these markers has access to a frame for the purpose of establishing a cross-office connection to a circuit appearing in the frame, no other marker may obtain access to the frame. The delay encountered by one marker while another marker of the group has access to a desired frame is known as marker waiting time. It is an aspect of the present invention that the stored program electronic processor 71 will asign a marker to establish a cross-office linkage only at a time when the frame to be involved in the linkage is immediately accessible to the marker.

Outgoing call

Assuming that a calling subscriber whose telephone line has an appearance in one of the line link frames such as LLF removes the telephone receiver from the switchhook, the line circuit (not shown) associated with the telephone line at the line link frame causes line link frame LLF to seize dial tone marker DTM in the usual manner. The appropriate line location information is transferred to the dial tone marker through the usual line link marker connector (not shown). The dial tone marker seizes one of the trunk link frames such as TLF through the trunk link connector (not shown) and selects an idle originating register such as 201 in the usual manner. The dial tone marker thereupon seizes the calling line through the line link connector (not shown) and controls the switches of the line and trunk link frames LLF and TLF to establish a dialing connection from the calling subscriber to the originating register. The dial tone marker thereupon releases itself from the frame.

Thus far, the stored program electronic processor 71 has not been involved in the call and operations have proceeded quite conventionally. When the dialed digits have been registered in originating register 201, the originating register would, in a conventional marker-controlled crossbar switching system, attempt to seize a completing marker through an originating marker connector such as 202. The conventional completing marker would then receive the information stored in the originating register, perform the required translations, and control the switches of the line and trunk link frames to establish a communications channel from the calling subscriber to the required outgoing or intraoffice trunk. However, in accordance with the present invention, the normal connection between the originating register marker connector 202 and the completing marker 41 is eliminated. Instead, the information leads which the connector would normally connect to the marker are brought into register-processor interface circuit 36.

The register-processor interface circuit 36 advantageously comprises a plurality of "ferrod" sensors of the type disclosed in Patent 3,254,157, issued May 31, 1966. When the originating register 201 has received all of the digits of the called number, it would normally operate one of a pair of marker start or MS– relays (not shown in FIG. 1) in the originating register marker connector 202. Accordingly, a spare contact of one of these MS– relays may be connected to apply an activating ground to one of the conductors scanned by the ferrods of the register-processor interface circuit 36. The appearance of ground on the lead from the MS– relay can consequently be interpreted as a scan point "activity" signal by scanner 60. The change of state of the ferrod associated with this activity scan point is registered in the processor in an F register (not shown) which stores the activity state of each unit subject to scanning. The position in the register of the bit indicating the activity of the originating register 201, together with the number of the scan on which the activity thereof is noted, is used by the processor to identify the fact that the processor is now ascertaining the activity of originating register 201. A binary number can thus be formed identifying the originating register 201. This binary number is used as an index into a table, also stored in the memory of processor 71, which table gives the address of the first word of storage allocated to originating register 201.

It will be recalled that the conventional originating register marker connector normally provides information, such as the digits dialed, the calling equipment location, and calling line class of service, over approximately 160 leads. Since the input registers of most stored program processors usually do not have capacity for 160 bit words, the information is transferred to the processor by means of a "directed scan." To perform the directed scan, two pieces of information are required—an enable address which selects the interface circuit associated with the originating register and the internal address in the signal distributor circuit 75 which designates the first of a group of multicontact relays in interface circuit 36. Operation of this multicontact relay in interface circuit 36 connects to the ferrods in the scanner 60 a group of originating register marker connector information leads that will not exceed the bit capacity of the processor input register. The internal address is then incremented to that of the next multicontact relay, and so on, until the scanner has examined all of the information leads of the register marker connector 202. Each time the information is so obtained by scanner 60, it is stored in memory at the location indicated by incrementing the address of the first word of storage previously obtained by reference to the aforementioned index table in the memory of processor 71.

Accordingly, it is seen that the identification of the activity bit is followed by ascertaining the address in memory at which information associated with the activity bit is to be stored. When this is obtained, the information is extracted from the connector by a directed scan of the interface circuit and sequentially transferred to the locations of processor memory assigned to the originating register.

Stored program electronic processor 71 then performs the translation of the called number digits stored in memory and, in accordance with the screening determined by the calling customer's class of service information, also stored in memory, completes the route translation. The result of the route translation program is a determination of the trunk route over which the call must be routed. Processor 71 consults its trunk status memory to determine the identity of an idle trunk serving the indicated route. The status of new trunks, such as trunk 501, is furnished to the trunk status memory of the processor during one phase of the routine scanning performed by scanner 60. Assuming that there is an idle trunk available for selection, processor 71 will select an idle one of completing markers 41, *41a* in memory, and, through marker-processor interface 700, pass to the selected marker 41, for example, the identity of the trunk link frame and trunk block relay of the frame designating the block of trunks which includes the one selected by the processor. It will be recalled that in the conventional operation of the marker, the marker never actually determines that a particular trunk is to be seized. The conventional route translation by a marker results merely in the selection of the block of trunks which includes at least one trunk of the group serving the indicated route. Before any trunk in the group so designated may be actually selected, however, the marker must have been able successfully to seize the trunk frame and seizure may be delayed if the trunk link frame was in use by another marker. When processor 71 is added to the marker-controlled crossbar switching system, however, the status of the trunk link connectors is also scanned by scanner 60 and therefore a call will not be assigned to a marker when the trunk link frame over which the call must be routed is in use by another marker. Thus while the call may have to be delayed, no marker will have been seized for use on that call and so common equipment operating time is not lost.

When the marker which has been seized has established that it can obtain a trunk, it energizes a scan point to inform scanner 60 that the switching frame linkage between the originating register 201 and the calling subscriber shall be released. This scan point is operated by the conventional release register linkage relay in the marker. The originating register linkage is normally held by the loop from the calling subscriber and would normally be released by the marker returning a ground to a register through the originating register marker connector. Since the connections between the originating register marker connector 202 and the completing marker 41 have been removed, the marker cannot directly release the register. Activation of the release register linkage scan point in the marker is therefore interpreted by processor 71 as a signal to distribute a command to signal distributor 75 which will operate a relay in register-processor interface circuit 36. This relay will apply the ground formerly provided by the marker to disconnect the register linkage to the calling subscriber. On the other hand, if the marker had been unable to obtain a channel with which to connect the calling subscriber and the indicated trunk, it would activate its return busy ferrod scan point. Scanner 60 would inform processor 71 and interface circuit 36 would be employed in similar fashion to cause originating register 201 to return busy tone to the calling subscriber.

If the processor was unable to find an idle trunk serving the indicated or any alternate route, the processor via the signal distributor 75 and register-processor interface circuit 36 would instruct the originating register to return busy tone to the calling subscriber. If for some reason the marker obtained an incorrect check indication, the marker would operate its second marker trial relay thereby activating a second marker trial scan point. The processor, upon being informed thereof by scanner 60, would instruct interface circuit 700 to release the marker and the processor would perform another directed scan of the information leads in register-processor interface circuit 36. The information so extracted would be processed again and a different marker would be seized by the processor to handle the call. The processor via the signal distributor would set a relay in the new marker informing it that it is handling a second trial call.

Assuming that the processor has been able to select a trunk in memory and has instructed the originating register to release its switching frame linkage to the calling subscriber, the processor would be executing either the outgoing call program or the intraoffice call program depending on the type of trunk indicated by route translation. Assuming the call to be an outgoing call, the processor consults that portion of its memory storing the status of its service logic circuits which contains the status of outpulsers appearing in link 8–12. The processor, as mentioned above, informs the marker of the trunk link frame number, trunk block number, and furnishes the marker an indication that an outgoing call to a new type trunk is involved. The processor operates link controller 72 to establish a connection in link 8–12 between the new trunk selected in the processor memory and the outpulser in the service logic circuits 801–1201 also selected in processor memory. The connection of the outpulser to the new trunk through the link causes the marker to seize the trunk on the trunk link frame.

After the marker has seized the trunk, the marker establishes a channel between the calling subscriber on the line link frame LLF and the new trunk on trunk link fram TLF. The marker is scanned by scanner 60 to determine when this channel is complete. When the marker has established the cross-office linkage between the calling subscriber and the trunk, the marker energizes its normal release relay. A contact of this relay activates a normal release scan point. The processor responsive thereto addresses signal distributor 75 to operate a relay in register-processor interface circuit 36 which will cause originating register 201 to release its marker "start" MS– relays. Release of these relays removes the activity signal from the register-processor interface circuit 36.

The contents of the processor memory used to register the digits which were employed in route translation are transferred to the processor memory assigned to the new trunk. The processor then executes its program for outpulsing the called number digits over the new trunk. The processor reads each digit from the memory associated with the trunk and applies to the outpulser of service logic circuits 801–1201 the information necessary to cause the outpulser to send the required digit. When the last digit has been sent, the processor disconnects the outpulser by instructing link controller 72 to break the connection in auxiliary link 8–12.

During the course of a call the trunk may change state several times. These changes are detected by the ferrods monitoring the local and outgoing ends of the trunk's transmission path. When scanner 60 detects a change in either of the ferrods monitoring the respective ends of the trunk's transmission path, program control is transferred to the appropriate program. Once the call has been set up, the permissible changes will indicate either a disconnect or a flash to call in one of the new service features. A check in processor memory is made for allowable features based on class of service. If no allowed features are found, a disconnection operation is performed. The disconnection comprises hunting and selecting a disconnect circuit in service logic circuits 801–1201, updating the portion of processor 71 memory assigned to disconnect circuits to show that a particular one thereof is selected, and instructing link controller 72 to connect the selected disconnect circuit to the trunk. That portion of processor 71 memory assigned to the trunk is then updated to show that it is available for use on a new call after the disconnect circuit has controlled its release at the expiration of the desired time-out interval.

Intraoffice call

If the result of translation had indicated that an intraoffice call rather than an outgoing call had been involved, the procedures would be the same expect that the processor would perform a number group translation of the called digits to obtain the equipment location of the called line. The processor would then select an available new type intraoffice trunk in memory, select an available ringing unit in the service logic circuits 801–1201, and inform the completing marker that a new type trunk was to be involved in the linkage to be established by the line link and trunk link frames LLF and TLF, respectively. The connection of the ringing unit to the new intraoffice trunk through the auxiliary link together with the new trunk indication furnished the marker enables the marker to set a linkage from the called appearance of the new intraoffice trunk to the called line. When this linkage is complete, the channel complete scan point of the marker informs the processor of the fact. The operation of the conventional marker check relay on an intraoffice call enables the marker to respond to second connection information distributed to its relays from the processor. When the marker has set the linkage from the calling telephone to the calling appearance of the intraoffice trunk, the channel complete scan point in the marker so informs the processor. The marker thereupon releases. The trunk memory assigned to the incoming trunk in the processor is updated. Program control is then returned to the executive control program.

Terminating call

When the switching system is seized for use on a terminating call arriving over one of the new type incoming trunks, scanner 60 will note the change in supervisory state of the ferrod monitoring the distant office end of the incoming trunk's transmission path. A portion of processor 71 memory is assigned to the trunk and the processor instructs link controller 72 to connect an incoming register circuit, in service logic circuits 801–1201 having a digit receiver appropriate to the class of incoming trunk, to the trunk through link 8–12. The memory assigned to the incoming register circuit in processor 71 is updated to indicate the identity of the trunk to which it is connected. When a digit receiver assigned to the incoming register circuit has received a digit, it activates an activity scan point in the incoming register circuit. Processor 71 then instructs scanner 60 to scan the digit receiver for the digit. The procedure is repeated until the office code digit or digits are placed in the processor 71 memory and checked for a valid office code. When the last digit has been received, an indication thereof is sent to the incoming register circuit. Program control is next transferred to the number group translation program and the digits are taken from memory and translated into the line equipment number location of the called subscriber. Processor 71 selects in memory an idle ringing unit in service logic circuits 801–1201, sets the ringing selection switch associated with the ringing unit and instructs signal distributor 75 to signal the incoming register circuit in service logic circuits 801–1201 to release, and updates the trunk memory to indicate the address and the identification of the ringing unit to which the trunk is connected. At the same time an idle marker is selected in processor memory, signal distributor 75 is instructed to operate the new trunk relay in the marker, and marker-processor interface circuit 700 is enabled to transfer the called information from processor 71 to completing marker 41. The connection of the ringing unit to the new trunk through the auxiliary link, combined with the operation of the new trunk relay in the completing marker, enables the trunk link frame end of the cross-office linkage to be seized. The marker then hunts for an idle channel from this point to the line link frame appearance corresponding to the call information furnished it. When the channel has been established, the channel complete scan point of the marker is activated informing the processor through scanner 60 of the fact. The processor then distributes a signal to completing marker 41 indicating the receipt by the processor of the channel check information and enabling the marker to disconnect. When the marker disconnects, the ringing unit connected to the trunk cuts through ringing from the ringing selection switch. The ringing code is selected by processor 71 and the ringing selection switch associated with the ringing circuit of service logic circuits 801–1201 is set by signals from distributor 75.

Included in service logic circuits 801–1201 are a plurality of disconnect circuits. Program instructions based on the status of the transmission path monitoring ferrods in the trunks determine under what circumstances processor 71 will instruct link controller 72 to connect one of the disconnect circuits to a specified trunk. Timing is done by the processor which informs the disconnect circuit when time-out has occurred, and responsive thereto, the disconnect circuit applies a signal through link 8–12 to the trunk to release the cross-office linkage.

In addition to the circuits above mentioned as being included in service logic circuits 801–1201; namely, the sender circuit, the incoming register circuit, the ringing circut, and the disconnect circuit, a plurality of other service logic circuits are available therein. Among these circuits are a coin-supervision circuit, a call-waiting circuit, an add-on circuit, a dial transfer circuit, and a conference bridge circuit. These circuits are connected to the new trunk appearing in trunk link frame TLF by link controller 72 as instructed by processor 71. When required by the particular program then being executed, these circuits (not shown in detail in FIG. 1) advantageously may be equipped to exert through link 8–12 the same form of control over the new trunk which will enable that trunk to be seized by the marker in the same manner as has been described above. Thus, the sophistication of program-controlled selection of special service logic circuits can be added to an existing marker-controlled crossbar switching office without requiring the marker to treat each of these different types of connections in a distinctive manner.

General description (FIGS. 2 through 12)

Figure 2:
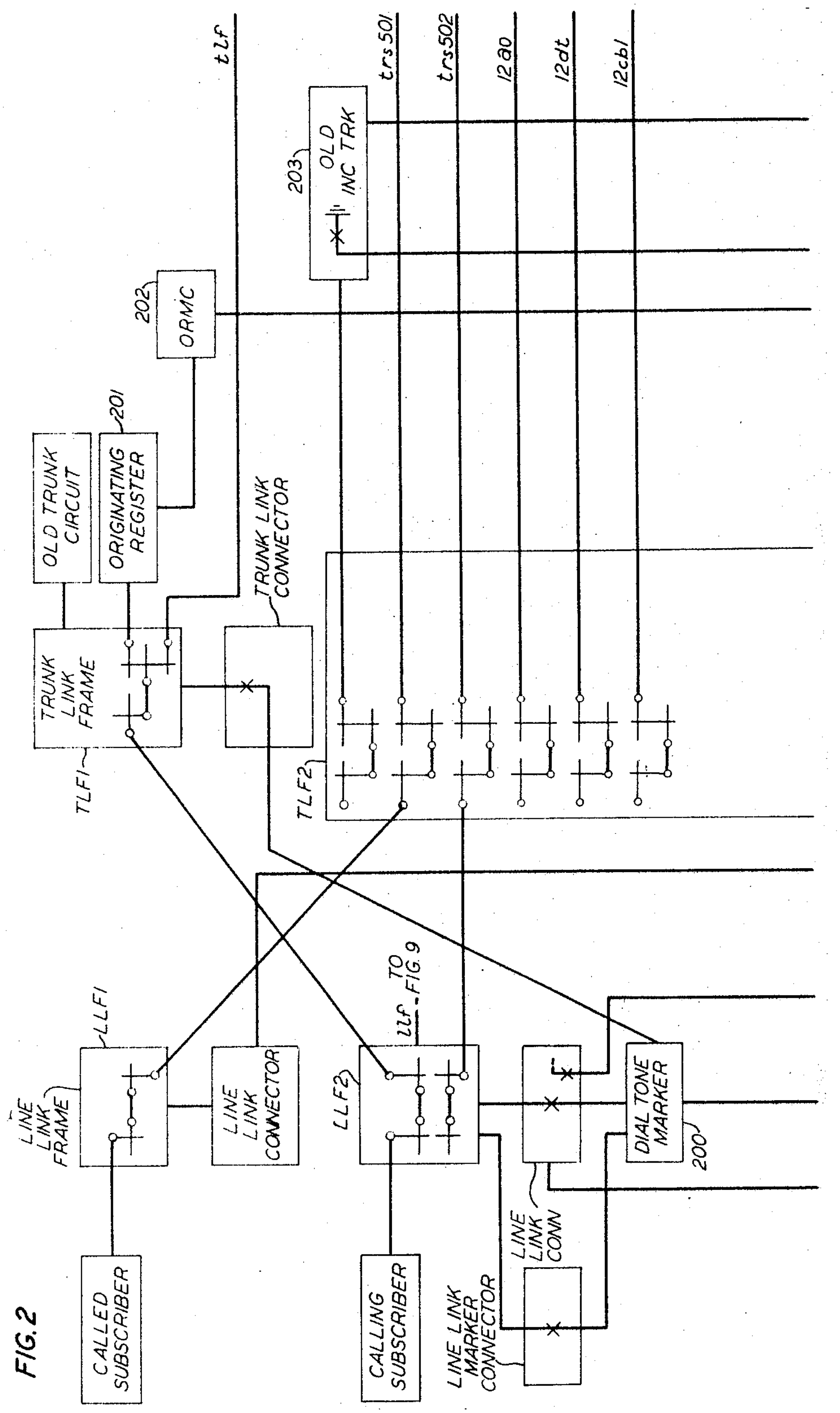
Figure 3:
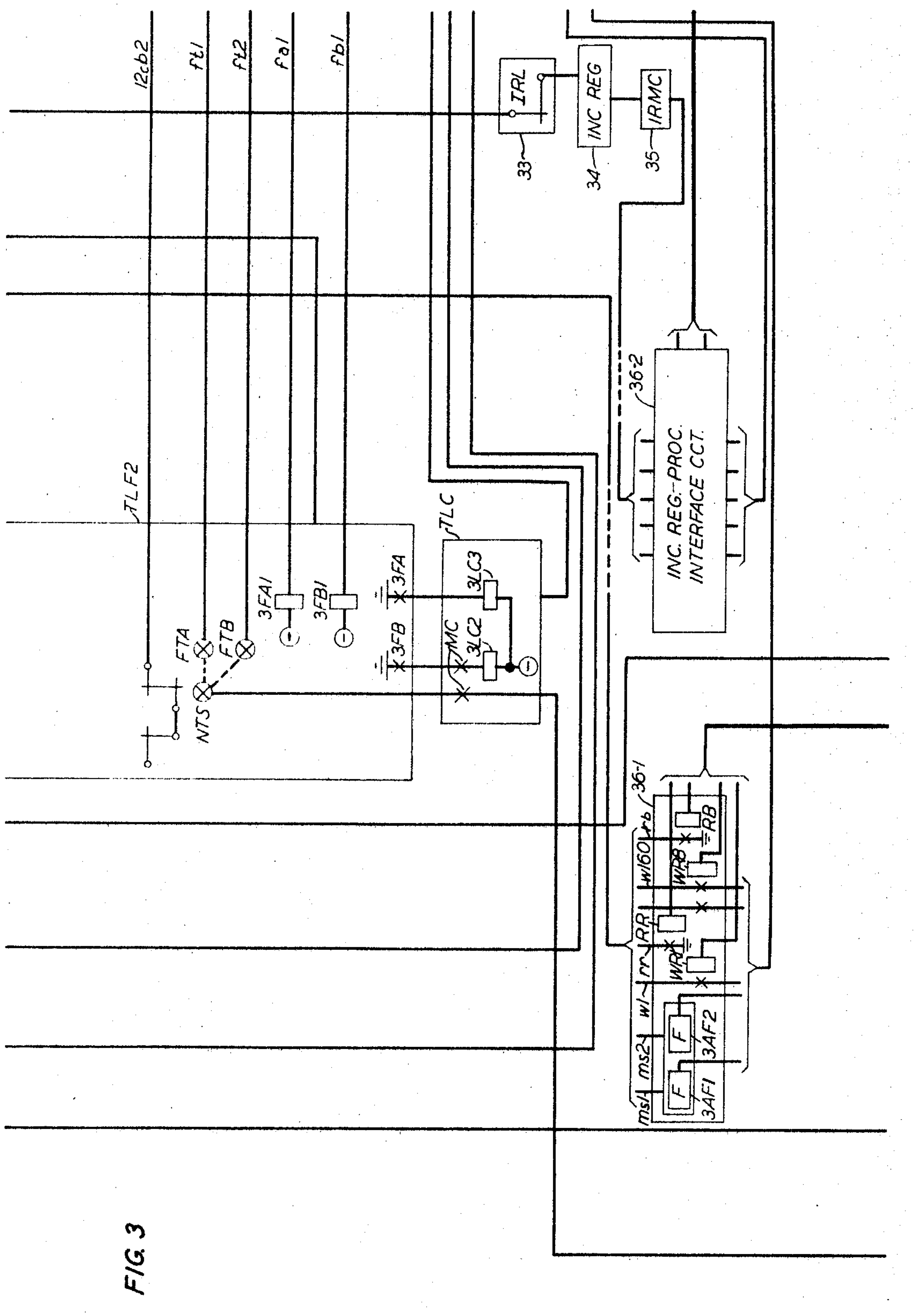
Figure 4:
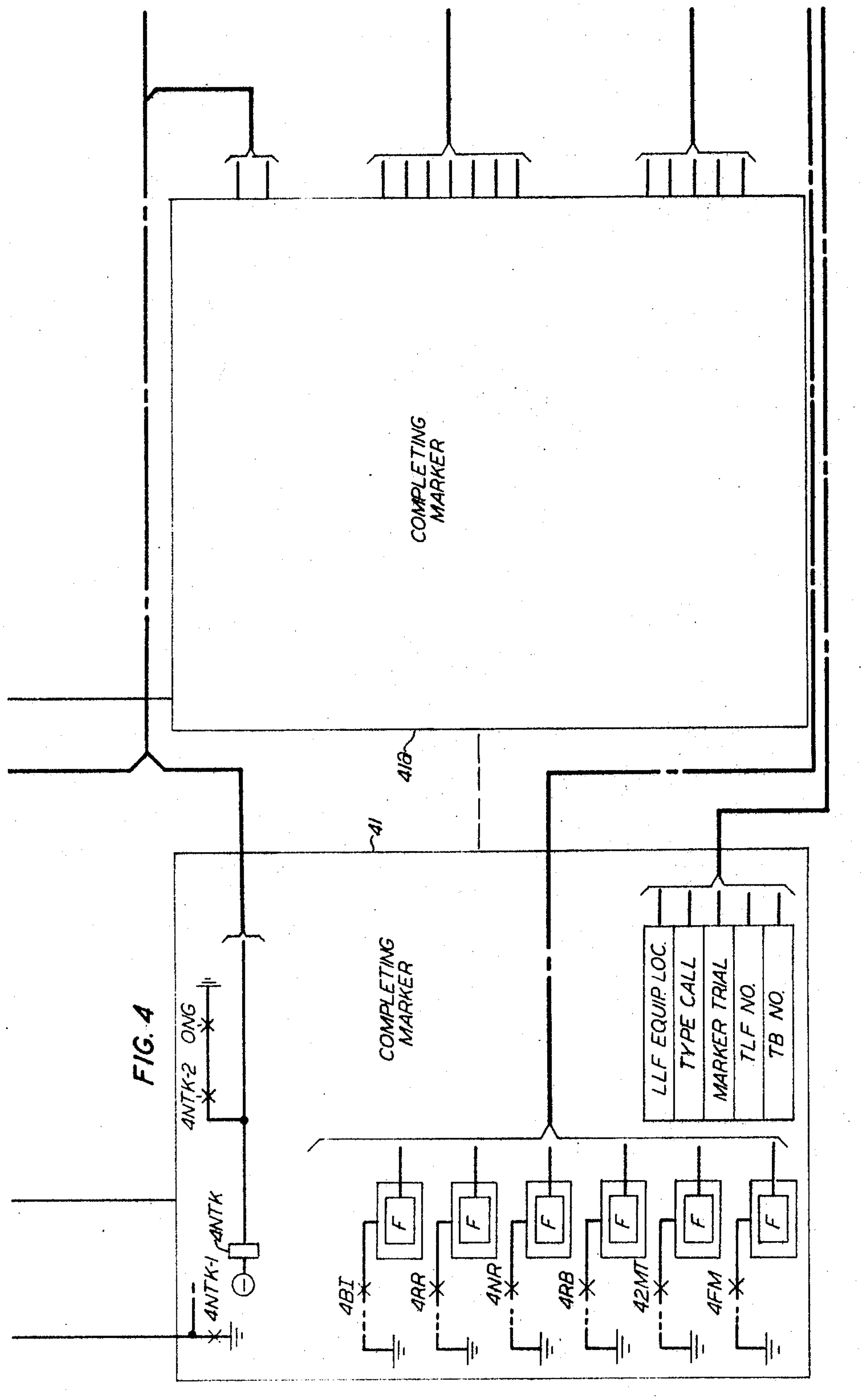

FIGS. 2 and 3 show the switching frames of the illustrative telephone office. A called subscriber's telephone equipment is shown appearing in line link frame LLF1 and a calling subscriber's equipment is shown in line link frame LLF2. Two trunk link frames TLF1 and TLF2 are shown. It may be assumed that trunk link frame TLF1 has entirely conventional trunk and originating register circuits appearing therein. Trunk link frame TLF2, however, is shown having at least one old trunk 203 appearing therein as well as two new trunk circuits 501 and 502, respectively. Dial tone marker 200 is shown in relationship to line link frame LLF2 and trunk link frame TLF1 for setting up a dial tone connection between the calling subscriber on line link frame LLF2 and the conventional originating register 201 appearing on trunk link frame TLF1.

Outgoing call

When the called number digits are registered in originating register 201, the latter activates its marker start relay MS1 (not shown) in originating register marker connector 202. Contacts of this MS relay ground the associated *ms*1 lead monitored by activity ferrod 3AF1 in originating register-processor interface circuit 36–1 (FIG. 3).

In FIG. 2, a scanner connection is shown to dial tone marker 200 which provides for informing processor 71 via scanner 60 each time the dial tone marker completes a linkage to an originating register. This provides a check on the validity of the information obtained from the originating register-processor interfact circuit scan point ferrods 3AF1,2.

Figure 6:
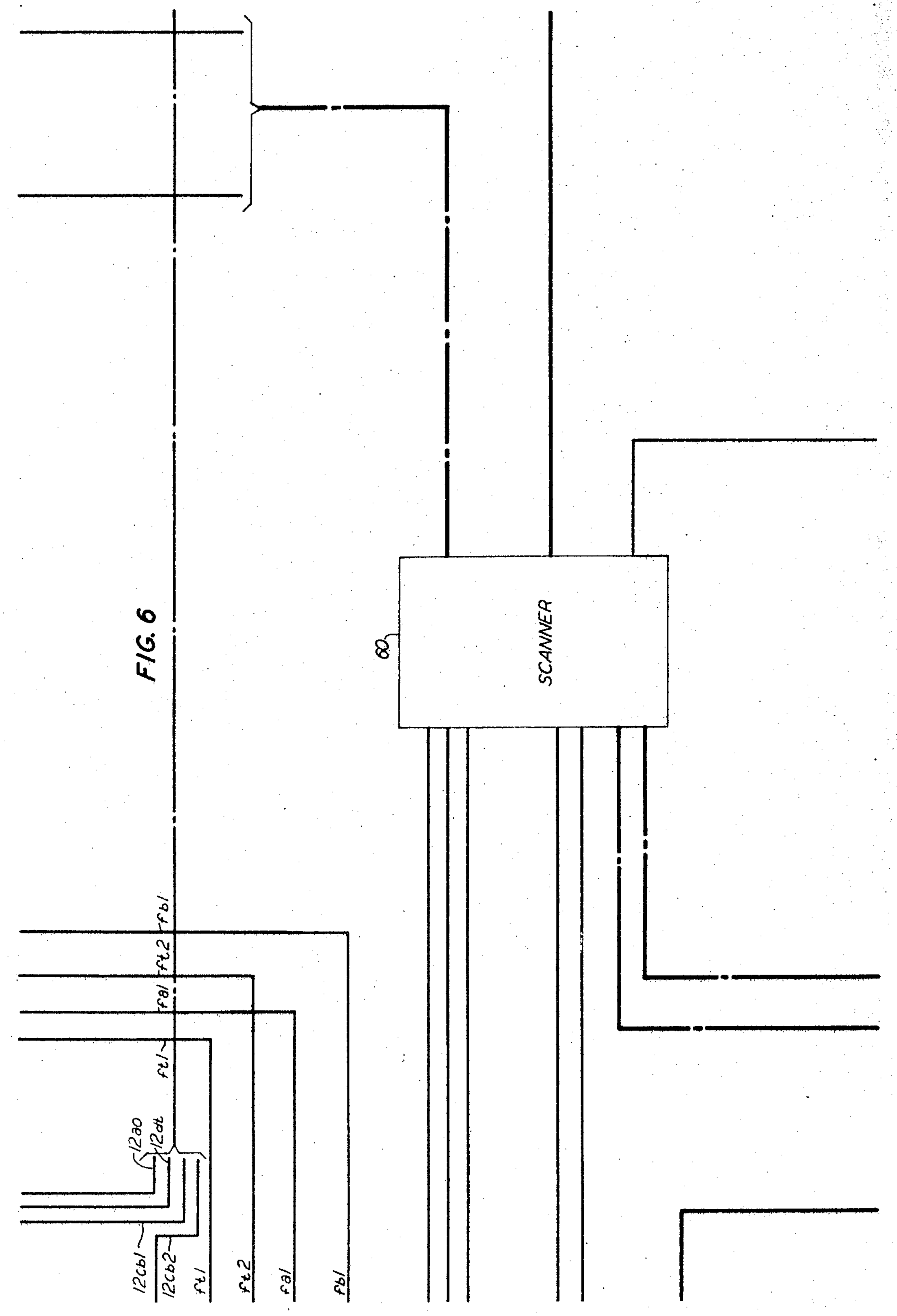
Figure 7:
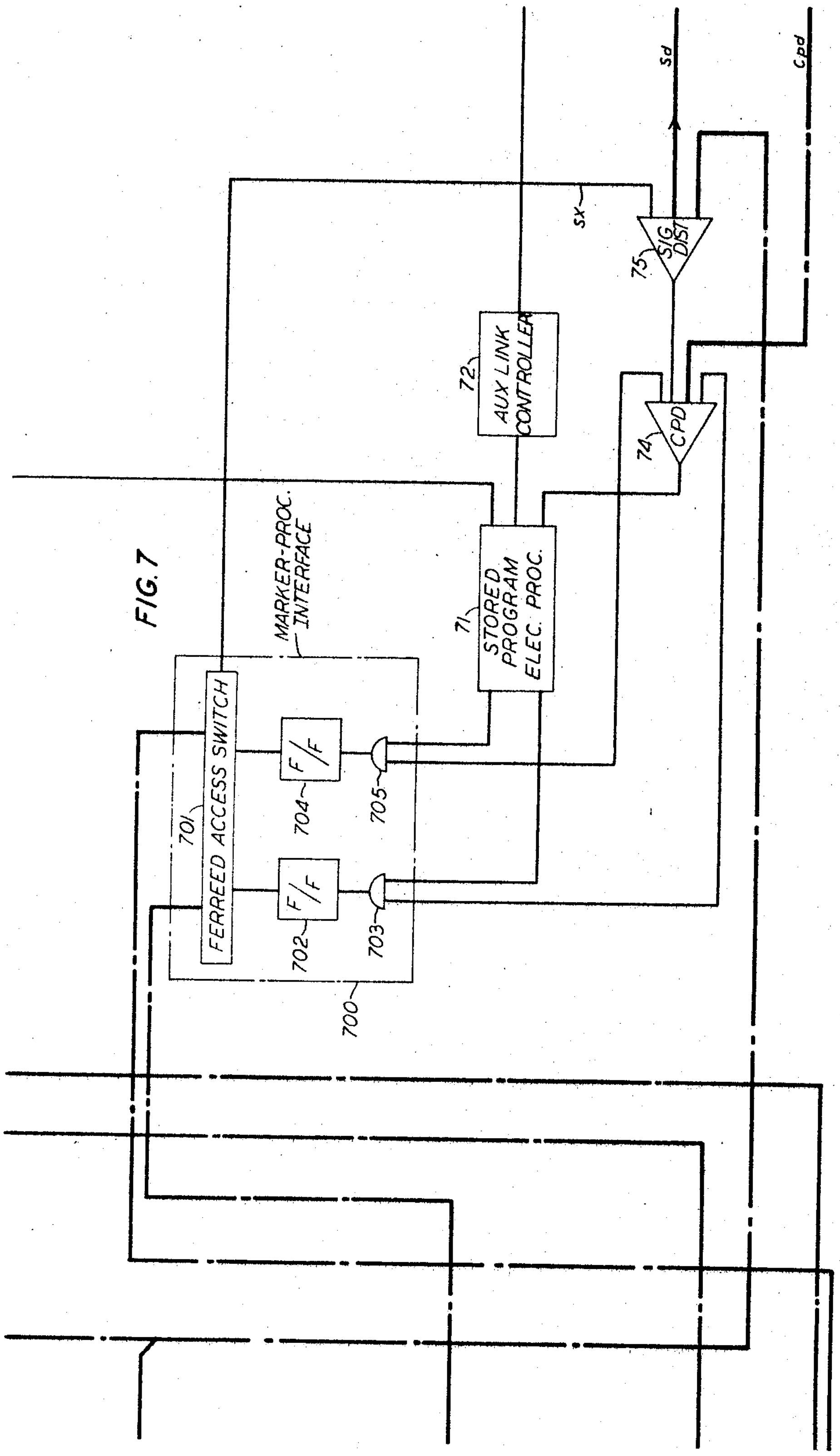

The grounding of lead *ms*1 is interpreted by processor 71 through scanner 60 as an indication to perform a directed scan to extract the information available on multiple information leads *w*1 through *w*160. These leads *w*1 through *w*160 would normally connect to the conventional completing marker. However this normal connection is eliminated and instead multicontact, directed-scan relays WR1 through WR8 are provided to connect a group of twenty of the leads at a time for scanning by scanner 60 (FIG. 6). The number of leads in a group so connected depends on the capacity of the data word input register (not shown) or stored program electronic processor 71 (FIG. 7). A 20-bit capacity, however, is impliedly assumed herein. The operation of the first multicontact, directed-scan relay WR1 is effected by signal distributor 75 being addressed by processor 71 through central pulse distributor 74. The ransmission of enable address informaion and signal disribuor inernal through central pulse distributor 74. The transmission of enable address information and signal distributor internal address information from processor 71 has been described above in connection with FIG. 1 and is known from the above-mentioned Bell System Technical Journal issue of September 1964 and will not be repeated herein.

When the information presented on the leads connected by the first multicontact relay WR1 has been scanned into processor 71, the directed scanning program indicates that the address in signal distributor 75 of the next of the multicontact, directed-scan relays should be transmitted to distributor 75, and so on, until all the information present on leads *w*1 through *w*160 has been entered into the memory area of processor 71 associated with originating register 201.

When the processor has determined, after route translation, that an idle trunk of the desired route is available, it will cause distributor 75 to operate relay RR of interface circuit 36–1. Relay RR operated grounds lead rr through the originating register marker connector 22 into originating register 201. The gorunding of this lead will remove the holding ground applied to the sleeve lead of the communications channel between the calling subscriber's equipment in line link frame LLF2 and the originating register 201 in trunk link frame TLF1. If no trunk were available, processor 71 would operate relay RB in interface circuit 36–1 via signal distributor 75 to cause originating register 201 to transmit overflow tone to the calling subscriber.

As described above in connection with FIG. 1, processor 71 performs the translation of the called number digits. The result of this translation is the determination of the trunk route over which the call shall be routed. When processor 71, after consulting its trunk status memory, has selected an idle trunk serving the indicated route, it selects an idle completing marker in memory, and through marker-processor interface 700 passes to the completing marker 41 so selected the identity of the trunk link frame and the trunk block relay on that frame which designates the block of trunks including the one selected in memory by the processor. It should be recalled that the conventional completing marker, when modified in accordance with the disclosure herein, will still not have the ability to select and seize a predesignated trunk. However, inasmuch as the status of new type trunks is maintained in processor 71 memory, the idle trunk hunting operation formerly performed by the conventional marker operating with conventional trunks may be eliminated. Moreover, the marker may be employed by processor 71 to complete a cross-office channel to the one trunk which the processor has preselected from its memory. Processor 71 accomplishes this by instructing auxiliary link controller 72 to operate auxiliary link 8–12 to connect the trunk which it has preselected in its memory with one of service logic circuits 801–1201. For example, when an outgoing call is being processed and a new type outgoing trunk has been preselected in processor 71 memory, link controller 72 will be instructed to connect an out sender circuit, such as outpulser 901 (FIG. 9), to the preselected trunk.

Figure 5:
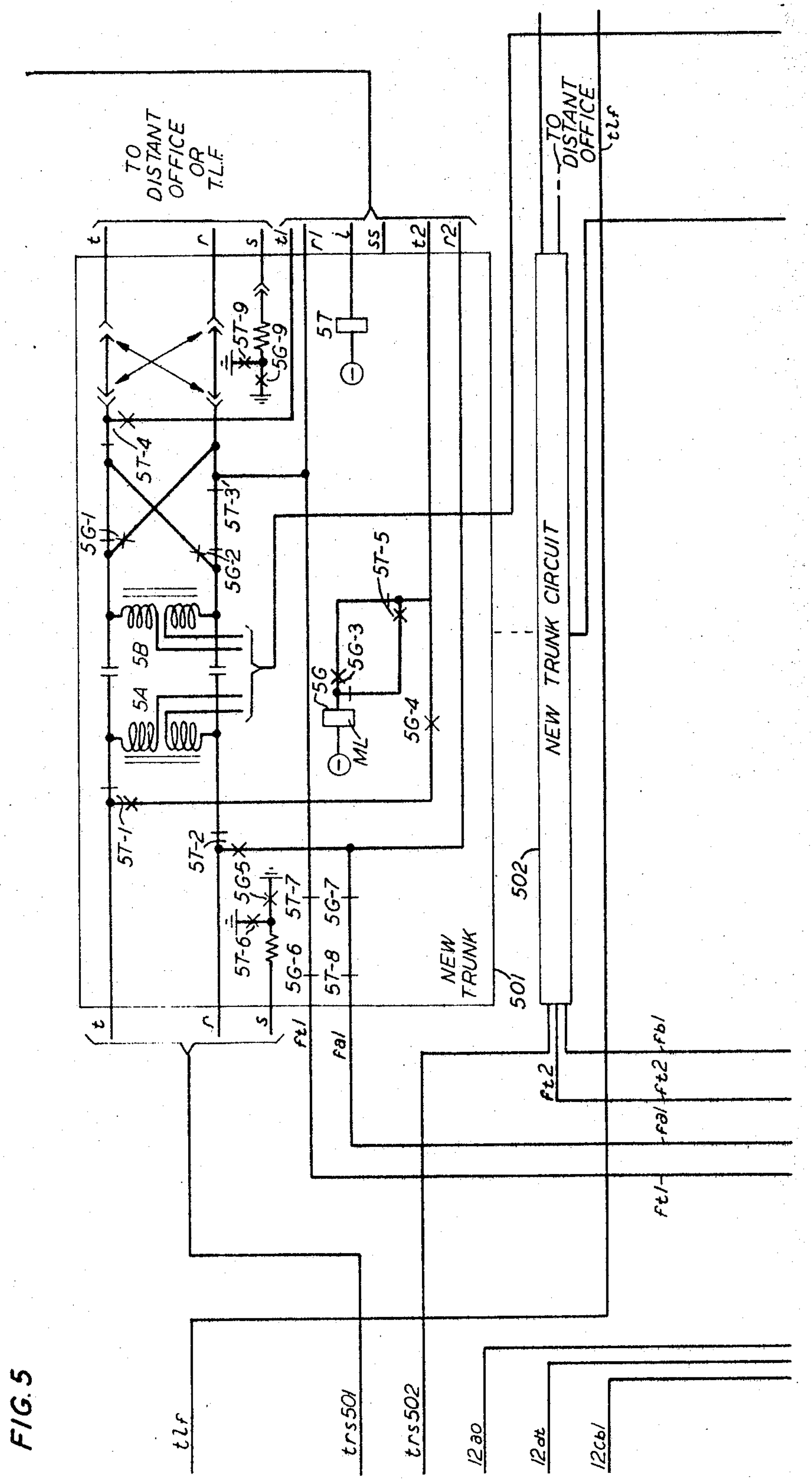

In FIG. 5, a typical new type trunk 501 is shown in some detail. The differences among new type trunks operating as incoming trunks, intraoffice trunks, and outgoing trunks are differences determined by the battery and ground connections made to the battery feed inductances 5A and 5B and whether the right-hand side of the trunk's transmission path terminates in a distant office or in another trunk link frame appearance in the same office. When trunk 501 is wired as an outgoing trunk, battery and ground will be provided through the respective ferrod in scanner 60 to the ends of battery feed inductances 5A and a closed circuit bridge will be provided through the respective ferrod in scanner 60 to the ends of battery feed inductances 5B. The sleeve connection at the right-hand side of the trunk's transmission path is required only when the trunk is to be wired as an intraoffice trunk. When used as an incoming trunk, battery and ground will be provided through the respective scanner ferrods to both the 5A and 5B inductances.

Returning now to the description of trunk circuit and service logic circuit operation, it will be recalled that processor 71 has connected out sender circuit 901 to the trunk 501 through the link 8–12. Processor 71 through signal distributor 75 operates relay 9A (FIG. 9) in the out sender circuit 901. Relay 9A, operated at its make contact 9A–4, applies ground to lead as to hold the connection to link 8–12. The manner in which the hold magnets of link 8–12 respond to the appearance of ground on lead as being well known is not shown in the drawing.

When relay 4NTK in marker 41 (FIG. 4) is operated, ground is extended over make contacts 4NTK–2 through trunk link connector TLC (FIG. 3) to punching NTS of trunk link frame TLF. When relay 4NTK is operated, it locks to ground provided over its make contact 4NTK–2 in series with a contact of marker off-normal relay ONG–. The winding (not shown) of relay ONG– is connected to marker work contacts (not shown) which establish an operating path for relay ONG– whenever the marker is seized for use (i.e., off-normal) and is de-energized when the marker has completed the function for which it was seized.

Each trunk appearing in trunk link frame TLF is provided with an FTA– and FTB– punching. However, only the punchings for new type trunks have been shown. The ground appearing on punching NTS is cross connected to the FTA– and FTB– punchings of new type trunks and is continued via a respective *ft*– lead to the respective trunk circuit. For example, trunk 501 in FIG. 5 has its *ft*1 lead connected to punching FTA– in FIG. 3 while trunk 502 is connected via lead *ft*2 to punching FTB– in FIG. 3. The ground appearing on lead *ft*1 is continued over break contacts 5G–6 and 5T–7 to lead *r*1 thence through link 8–12 to lead *r*1 of out sender circuit 901. The ground on lead *r*1 operates relay 9F. Relay 9F operated, at its make contact 9F–1, operates slow release relay 9F1 which, at its make contact 9F1–1, grounds lead *r*2. The ground on lead *r*2 continued through link 8–12 appears on lead *r*2 of trunk 501 and is continued over break contacts 5G–7 and 5T–8 to lead *fa*1. The ground on lead *fa*1 operates relay 3FA1 associated with trunk 501 in trunk link frame TLF, FIG. 3. Relay 3FA1 operated designates the level and switch relays (not shown) in the trunk link frame necessary to establish a cross-office linkage to the appearance therein of trunk 501.

Relay 9F operated also operates relay 9Y2, the connection being made over contact 9F–3. Relay 9Y2 locks over its make contact 9Y2–2, make contact 9A–3, and break contact 9S1–2. At this time relay 9Y1 cannot be operated by relay 9Y2 because of the open circuit provided by operated break contact 9F–4.

When the marker has completed setting up a cross-office linkage, ground will be removed from lead *ft*1 and in turn from lead *r*1, thereby releasing relay 9F. The release of relay 9F prepares relay 9F1 for release. Relay 9F1 is a slow release relay which prevents removal of ground from leads *r*2 and *fa*1 before out sender 901 can apply ground to lead *i* by the release of break contact 9F–2. The application of ground to lead *i* operates relay 5T in trunk 501. Relay 5T operated, at its make contact 5T–6, applies ground to the *s* lead of cable *trs* 501. The ground on this *s* lead holds the cross-office linkage established by the marker.

Relay 5T operated, at its transfer contacts 5T–3 and 5T–4, connects the tip and ring leads *t* and *r* to the distant office through leads *t*1 and *r*1. Outpulser OP of out sender circuit 901 will subsequently be connected across leads *t*1 and *r*1 for outpulsing the called number to the distant office. Relay 5T operated, at its transfer contacts 5T–1 and 5T–2, transfers the tip and ring leads *t* and *r* of cable *trs* 501 to leads *t*2 and *r*2. Transfer contacts 5T–3 and 5T–4 transfer the tip and ring to the distant office to leads *t*1 and *r*1 of out sender circuit 901. Outpulser OP, associated with the *t*1 and *r*1 leads, conducts a test of the potentials provided by the distant office across these leads. If this indicates that the remote office has seized a trunk, outpulser OP will so inform the processor over appropriate leads of scanner cable *scn*. Processor 71 responsive thereto will instruct controller 72 to disconnect out sender 901 from the selected trunk and select a new outgoing trunk. If the trunk exhibiting this remote seizure condition is in fact a two-way trunk, the processor will attach an incoming register circuit to the trunk. On the other hand, if the remote seizure condition is exhibited by a one-way outgoing trunk, the processor records a trouble condition for maintenance purposes.

The supervisory state of the calling subscriber's loop will be monitored by relay 9S of the out sender circuit as soon as trunk relay 5G is operated. Relay 5T, at its make contact 5T–5, prepares an operating path to the winding of magnetic latching relay 5G.

Relay 9F released, at its released break contact 9F–4, completes the operating path for relay 9Y1. Relay 9Y1 operated, at its make contact 9Y1–1, activates the magnetic latching relay operating circuit in out sender 901. The magnetic latching relay operating circuit provides in well-known manner a pulse of the appropriate polarity and measured duration to lead *t*2 to operate relay 5G in trunk 501. Relay 5G operated, at its make contacts 5G–4,5, completes the continuity between lead *t* of cable *trs* 501 and lead *t*2 so that the state of the calling subscriber's loop can be monitored by relay 9S. When relay 9F1 releases, its break contacts 9F1–2 and 9F1–3 insert supervisory relay 9S across leads *t*2 and *r*2. Supervisory relay 9S monitors the loop to the customer's line connected by the cross-office linkage to the left-hand side of trunk 501. Relay 9S is operated by the off-hook condition of the calling subscriber's telephone set connected thereat. Relay 9S operated, at its make contact 9S–1, operates slow release relay 9S1 which connects outpulser OP to leads *t*1 and *r*1 and disconnects relay 9F from lead *r*1. Relay 9S1, at the back contact of its transfer contacts 9S1–2, opens a locking path for relay 9Y2 which releases. Relay 9Y2, released, releases relay 9Y1.

Outpulser OP then outpulses the required digits as instructed by processor 71 via central pulse distributor 74 over cable *cpd*. When outpulser OP has completed outpulsing the digits, processor 71 is apprised thereof via scanner 60 and the leads of cable *scn* are connected to outpulser OP. Thereupon processor 71 addresses signal distributor 75 to distribute a signal of the appropriate lead of cable *sd* to release relay 9A. Relay 9A released, releases relays 9S and 9S1 restoring out sender 901 to normal. The release of relays 9A and 9S1 removes the holding ground which out sender 901 had applied to lead *ss* thereby breaking its connection to trunk 501 through link 8–12.

Incoming call

Thus far trunk 501 has been described in connection with out sender circuit 901 as an outgoing trunk. The circuitry shown in trunk 501, however, is equally capable of functioning as an incoming trunk. The difference in operation is illustrated by the association of trunk 501 with incoming register circuit 801. Processor 71, upon being informed by scanner 60 that the ferrod associated with inductor 5B of trunk 501 has been activated by the remote office, will instruct link controller 72 to establish a connection between trunk 501 and incoming register circuit 801. Processor 71 addresses signal distributor 75 to distribute an operating pulse over an appropriate lead of cable *sd* to operate relay 8A. Relay 8A operated, at its make contact 8A–1, grounds lead *i* to operate relay 5T in trunk 501. Relay 5T operated transfers leads *t* and *r* from the distant office to leads *t*1 and *r*1 associated with incoming register circuit 801. Relay 8A operated, at its make contact 8A–3, operates a 200-millisecond timer in the incoming register circuit. At the end of the 200-millisecond interval, the timer operates relay 8WS which, at its contacts 8WS–1, 8WS–2, reverses the polarity applied through ferrod 8AF1 to leads *t*1 and *r*1. The 200-millisecond interval corresponds to the duration of the "wink" start signal conventionally used in register signaling over the trunk. Ferrod 8AF1 notifies scanner 60 via cable *scn* as to the supervisory state exhibited by the distant office. Associated with leads *t*1 and *r*1 of incoming register circuit 801 is a single or multidigit digit receiver. The digit receiver operates relay 8DR of incoming register circuit 801 when it has completely received a digit. Relay 8DR, at its make contact 8DR–2, activates activity ferrod 8AF2 to inform processor 71 via scanner 60 that the digit has been received and is ready to be read. Electronic processor 71 then reads the digit from the digit receiver and addresses signal distributor 75 to distribute an operating pulse over a lead of cable *sd* to operate relay 8EC. Relay 8EC operated, at its make contact 8EC–1, signals the digit receiver that the processor has read the digit; the digit receiver then clears itself in preparation for receiving the next digit and releases relay 8DR. Relay 8DR removes the activation from ferrod 8AF2 and, at its released make contact 8DR–3, releases relay 8EC. This cycle is repeated until all the digits have been received, whereupon processor 71 addresses signal distributor 75 to distribute a release pulse to relay 8A. If the digit receiver employed is a multidigit receiver, the operation is substantially the same except that relay 8DR would not be operated until all the digits had been received. When trunk 501 has completed its operation with incoming register 801, relay 5T is released by the removal of ground from lead *i*. Relay 5T released restores the transmission path from the distant office to leads *t* and *r* of cable *trs* 501.

When processor 71 has translated the digits provided to it by the digit receiver of incoming register circuit 801, it will seize ringing circuit 1001 (FIGS. 9 and 10) by distributing a pulse over cable *sd* to operate relay 10A. Relay 10A locks over make contact 10A–10 and break contacts 10RT–1 and 10Y2–10. Relay 10A operated, at its make contacts 10A–2 and 10A–3, connects the winding of relay 10F to lead *r*1.

At the same time the processor informs the marker via interface circuit 700 as to the number of trunk line frames on which the incoming trunk carrying the call appears. The marker operates the trunk link connector to connect the marker with the trunk link frame. Assuming the call to have arrived over a new trunk, such as trunk 501, the marker instructs signal distributor 75 to operate new trunk relay 4NTK in the marker. In the manner priorly described, the operation of relay 4NTK extends an enabling ground to the NTS punching of the trunk link frame. The ground appearing on the NTS punching is cross-connected to all the new trunks appearing on the frame and operates relay 10F in ringing circuit 1001. Relay 10F is operated by the ground applied by the trunk to lead *r*1. Relay 10F operated, at its make contact 10F–4, operates slow release relay 10F1. Relay 10F1 operated, at its make contact 10F1–3, grounds lead *r*2 to enable the marker to establish the cross-office linkage to the trunk link frame appearance of trunk 501. Relay 10F operated, at its make contact 10F–6, operates relay 10Y2 which locks in series with contacts 10Y2–7, 10Y1–4, and 10A–8. When the marker has completed setting up the cross-office linkage, it removes ground from lead *r*1 allowing relay 10F to release. The release of relay 10F permits ground to be applied to lead *i* over the path: ground, make contact 10A–4, break contacts 10F–5 and 10Y1–2, and make contact 10Y2–9. Relay 5T in trunk 501 operates in response to the appearance of ground on lead *i*. Relay 5T operated, at its transfer contacts 5T–3 and 5T–4, transfers the tip and ring from the distanct office to lead *t*1 and *r*1 where, in ringing circuit 1001, they are connected to supervisory relay 9B in parallel with the audible ringback source and associated with ringing circuit 1001. Relay 9B operates, operating relay 10B1. Relay 10B1 operated, at its make contact 10B1–5, activates the magnetic latching relay operating circuit which applies a pulse of appropriate polarity and measured duration to lead *t*2. This pulse on lead *t*2 operates magnetic latching relay 5G in trunk 501. When relays 5T and 5G are operated in trunk 501, slow release relay 10F1 will have released. Relay 10F1 released, removes ground from lead *r*2 and, at its released break contacts 10F1–2, connects leads *t*2 and *r*2 to the ringing selection switch associated with ringing circuit 1001. Relay 10B1 operated, at its make contact 10B1–6, operates relay 10Y1. Ringing is applied from the ringing selection switch to leads *t*2 and *i*2 to the trunk and therethrough to leads *t* and *r* of cable *trs* 501 to the called subscriber. When the called subscriber answers, relay 10RT operates and, at its break contacts 10RT–1 and 10RT–2, releases relays 10A and 10Y2, respectively. Relay 10A released, releases relay 5T in trunk 501 restoring the transmission path therein to the talking mode. Relay 10A released, removes the holding ground from lead *ss*, breaking the connection between ringing circuit 1001 in trunk 501.

In FIG. 3, the conventional incoming register link 33, incoming register 34, and incoming register marker connector circuit 35 are shown in association with old trunk 203. Inasmuch as the marker and processor must be capable of working with old as well as new type trunk circuits, incoming register-processor interface circuit 36–2 is provided to inform processor 71 via scanner 60 when a conventional incoming register requires a marker in connection with an incoming call. Register processor interface circuit 36–2 is essentially similar to interface circuit 36–1 in that it contains multicontact, directed-scan relays and ferrod scan points for informing the processor as to the information content presented on the plurality of individual leads in the incoming register marker connector circuit. The processor, when provided with the information from the incoming register-processor interface circuit 36–82, will proceed to effectuate a number group translation and then pass to the marker via interface circuit 700 the trunk link frame location of conventional trunk 203 as well as the line link frame equipment location obtained as a result of the number group translation. When the linkage has been established, the marker informs the processor and the processor releases itself from the marker.

Intraoffice call

When new trunk 501 is to be employed as an intraoffice trunk, the right-hand end of its transmission path will have the sleeve lead connection, and the tip, ring, and sleeve conductors *t*, *r*, and *s* will be provided with a trunk link frame apperance. Operation of the trunk then requires that processor 71 in conjunction with ringing circuit 1001 control the sleeve leads at left and right-hand ends of the trunk's transmission path. When the ringing circuit has operated trunk relay 5T in the manner described for the incoming trunk, a path is prepared for operating trunk relay 5G. When relay 5G operates, resistance ground is applied to the sleeve leads at each end of the trunk's transmission path. The ringing selection switch associated with ringing circuit 1001 applies ringing across the *t*2 and *r*2 conductors toward the called subscribed and the audible ringback circuit associated with ringing circuit 1001 applies audible ringback across the *t*1 and *r*1 conductors toward the calling subscriber.

Figure 12:
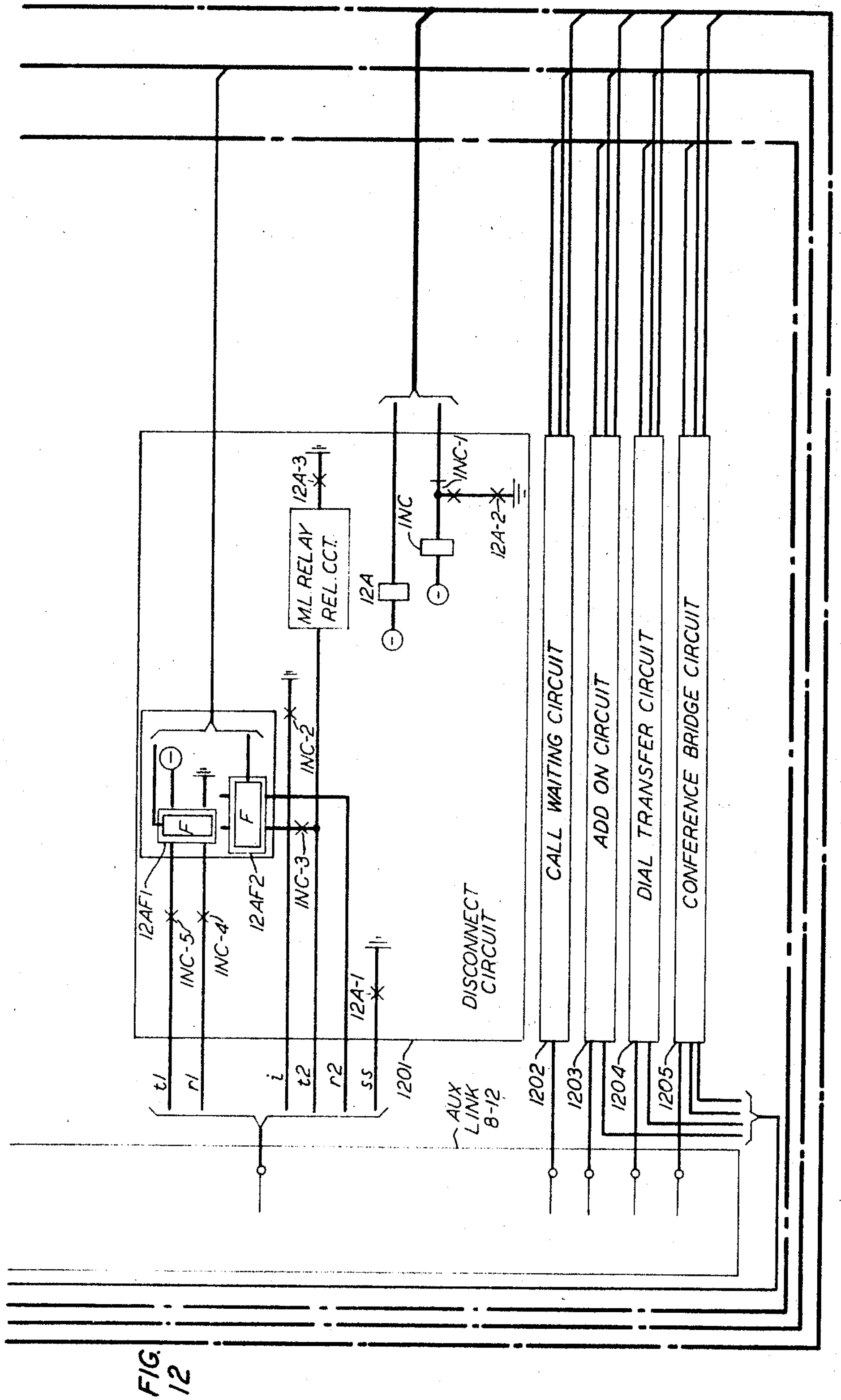

The disconnect circuit 1201 is shown in FIG. 12. This circuit performs the function of trunk release. When processor 71 is informed by scanner 60 that the ferrods monitoring a trunk's transmission path indicate a potential disconnect condition, it instructs auxiliary link control circuit 72 to establish a connection in auxiliary link 8–12 between disconnect circuit 1201 and the trunk. When the disconnect circuit is connected to an outgoing trunk or to an intraoffice trunk, processor 71 will have already done the timing necessary to discriminate against a temporary hit on the line. Accordingly, the connection of disconnect circuit 1201 to the trunk under this condition causes the magnetic latching relay releasing circuit to apply a pulse of appropriate polarity and duration to release relay 5G in the trunk. The magnetic latching relay releasing circuit will have been activated for this purpose by contact 12A–3 of the 12A relay which was operated by processor 71 via signal distributor 75 and an appropriate lead of cable *sd* incident to the selection of this disconnect circuit by the processor.

In the event that disconnect circuit 1201 is connected to an incoming trunk, it will first release the 5G relay and then operate the 5T relay of the trunk. If the called customer had disconnected first, this fact would be indicated to the processor by ferrod 12AF1 associated with leads *t*2 and *r*2. When the distant customer disconnects, ferrod 12AF1 so indicates to the processor via scanner 60. The processor thereupon releases relay 12A which opens the locking path for relay INC. Relay INC released, at its released make contact INC–2, removes ground from lead *i* releasing relay 5T in the trunk. The release of relay 12A removes holding ground from lead *ss* disconnecting the disconnect circuit from the trunk.

If the distant subscriber associated with leads *t*1 and *r*1 had disconnected first, the fact would be indicated to processor 71 via scanner 60 by ferrod 12AF1. Trunk relay 5G would first be released by the operation of contact 12A–3 as above described and then trunk relay 5T would be operated by mtake contact INC-2 applying ground to lead *i*. Processor 71 then executes a program designed to detect the end of the trunk time-out interval (conventionally approximately thirteen seconds), disconnect by the local subscriber, or a re-seizure by the distant office. Upon any of these three conditions occurring, processor 71 will distribute a signal to release relay 12A, as indicated above, and enter the next appropriate processing program.

Coin operation

On coin calls the initial deposit of the coin in the coin box of the calling telephone permits the dial tone marker to establish in the usual manner a connection to the originating register. The originating register, via originating register marker connector 202 and originating register-processor interface circuit 36–1, transfers the called number and the coin class of services indication to the processor. The processor selects an outgoing trunk in the manner described above. The processor, after the initial interval determined by the type of coin call being processed, connects coin supervision circuit 1101 to the outgoing trunk. The connection is made by signal distributor 75 operating relay 11A.

Coin supervision circuit 1101 includes a plurality of well-known functional circuits such as a test for coin present circuit, a coin return circuit, a coin collect circuit, and a tone (warning) circuit which, for simplicity, are shown in block form. Connection of these functional circuits is controlled by magnetic latching relays 11C1, 11C2, and 11C3 via distributor 75. To attach the overtime monitor circuit, relays 11C1 and 11C3 are operated and relay 11C2 is unoperated. To connect the tone (warning) circuit to inform the calling party that the talking period is about to expire and that another coin should be deposited, relay 11C1 is operated. This relay, at is make contacts 11C1–7, 8, connects both the tone circuit as well as the coin collect circuit to the trunk, the path to these circuits being completed over break contacts 11C3–6, 11, 12, 13. The test for coin present circuit is connected by the processor operating relay 11C3 with relays 11C1 and 11C2 released. Relay 11C3 cuts through the test for coin present circuit at its operated make contacts 11C3–14 and 11C3–15. This path is completed over break contacts 11C1–4, 5 and 11C2–1, 2. The coin collect circuit can also be connected to the trunk to collect the coin, without the tone circuit being applied, by the processor operating relays 11C2 and 11C3. This path is completed over make contacts 11C3–8 and 11C3–8′ and make contacts 11C2–3, 4. The tone circuit is isolated under these conditions by released make contacts 11C1–8 and 11C1–7 as well as the operated break contacts 11C3–11 and 11C3–13. The coin return circuit is connected by processor operating relay 11C2 with relays 11C1 and 11C3 being nonoperated.

On a ten-cent initial interval, five-cent overtime call, the processor will instruct the coin supervision circuit to send a signal to the trunk to collect the coin and to send a notifictaion toward the calling subscriber to deposit another coin. Coin supervision circuit 1101, via its associated test-for-coin-present circuit, then verifies to the processor that the new coin has in fact been deposited. If the coin has not been deposited, the processor will operate relays 11C1 and 11C3 to connect an overtime monitor position to the coin supervision circuit.

In coin zone operation, the processor would operate relays 11C1 and 11C3 as soon as the connection to the selected outgoing trunk was established. The operator would then inform the coin customer what coins should be inserted for the initial interval. Thereafter, the operation will continue as described above for each additional interval.

Other service circuits

When the processor determines that a new call is incoming to a subscriber already occupied on another call, it connects the incoming call to call-waiting circuit 1202. At the same time, the processor connects the call-waiting circuit to the trunk carrying the original call. The processor instructs the call-waiting circuit to apply a notification tone to the trunk carrying the original call. If the subscriber wishes to place the original call on hold and accept his new call, he flashes his switchhook. The switchhook flash is interpreted by call-waiting circuit 1202 to place the transmission path of the original trunk on hold and to cut through the connection between the original trunk and the trunk carrying the new call. A subsequent switchhook flash will then be interpreted as a signal to re-enter the original call and place the new call on hold. This procedure may be repeated until one of the parties disconnects.

Add-on circuit 1203 is connected to a trunk when the subscriber class of service stored in processor 71 indicates that the subscriber is accorded the add-on privilege. A switchhook flash from such a subscriber causes processor 71 to connect the trunk to add-on circuit 1203. At the same time the processor will connect a digit receiver to link 8–12 similar to that described in connection with incoming register 801. The subscriber will then dial the digits of the station to be added into the connetcion. Add-on circuit 1203 is provided with an appearance on trunk link frame TLF2 via cable 12*ao*. The digits registered in the digit receiver are entered into the processor which then instructs an available one of markers 41, 41*a* to establish a linkage from the subscriber to be added in to the trunk link frame termination of cable 12*ao* associated with circuit 1203. When the linkage has been established, processor 71 will control add-on circuit 1203 to ring the subscriber to be added in to the connection and when the subscriber answers, add-on circuit 1203 will cut through a path between cable 12ao and the trunk over which the switchhook flash request for add-on was detected.

Dial transfer circuit 1204 is similar to add-on circuit 1203 except that once the circuit initiating the three-way connection has disconnected, the connection between the remaining two parties will be permitted to continue. Conference bridge circuit 1205 is provided with an appearance in link 8–12 as well as two appearances, 12CB1 and 12CB2, in trunk link frame TLF2 (FIGS. 2 and 3). An additional appearance (not shown) may be provided in one of line link frames LLF1, 2 to permit conference with a subscriber outside of this telephone office.

Figure 8:
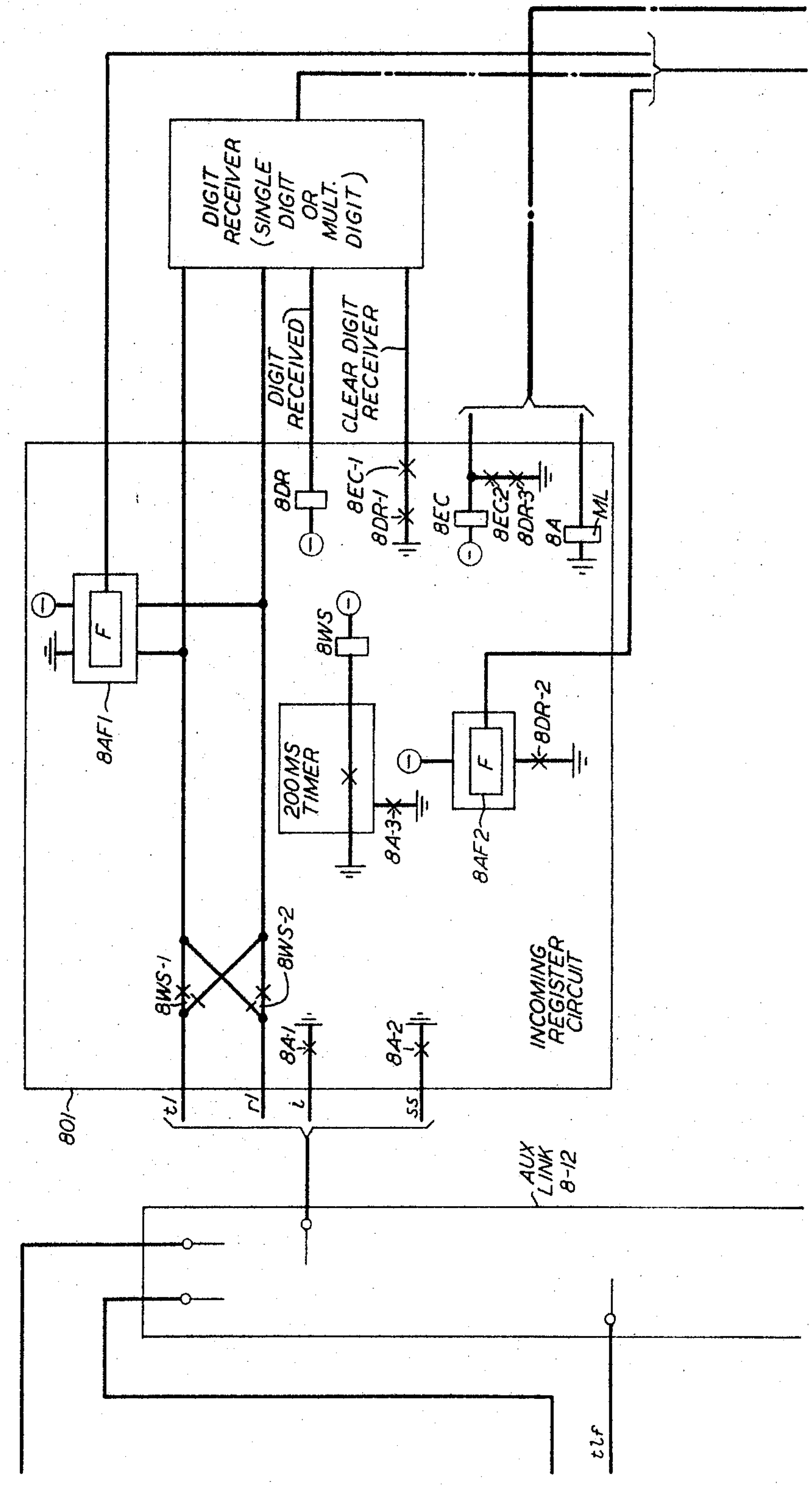
Figure 9:
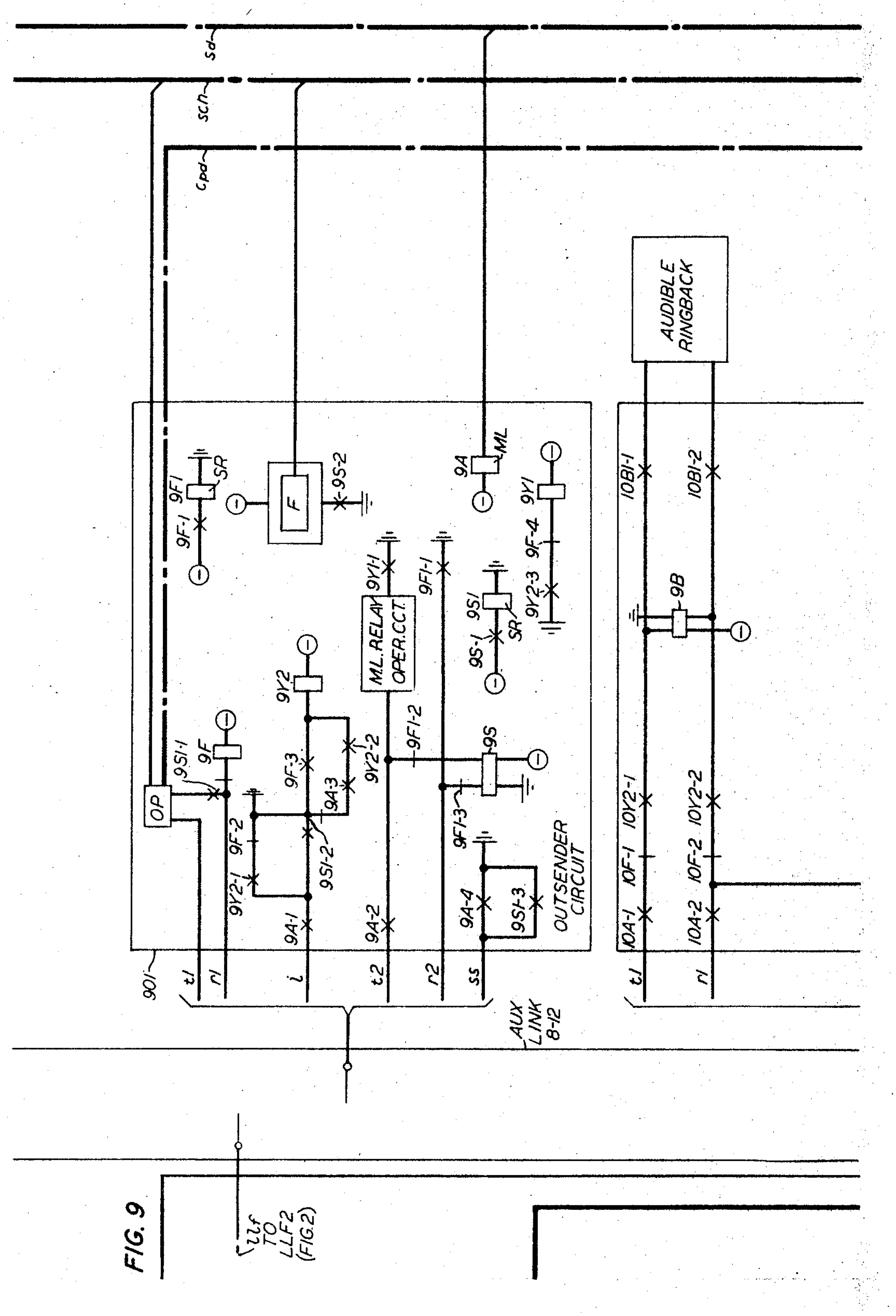
Figure 10:
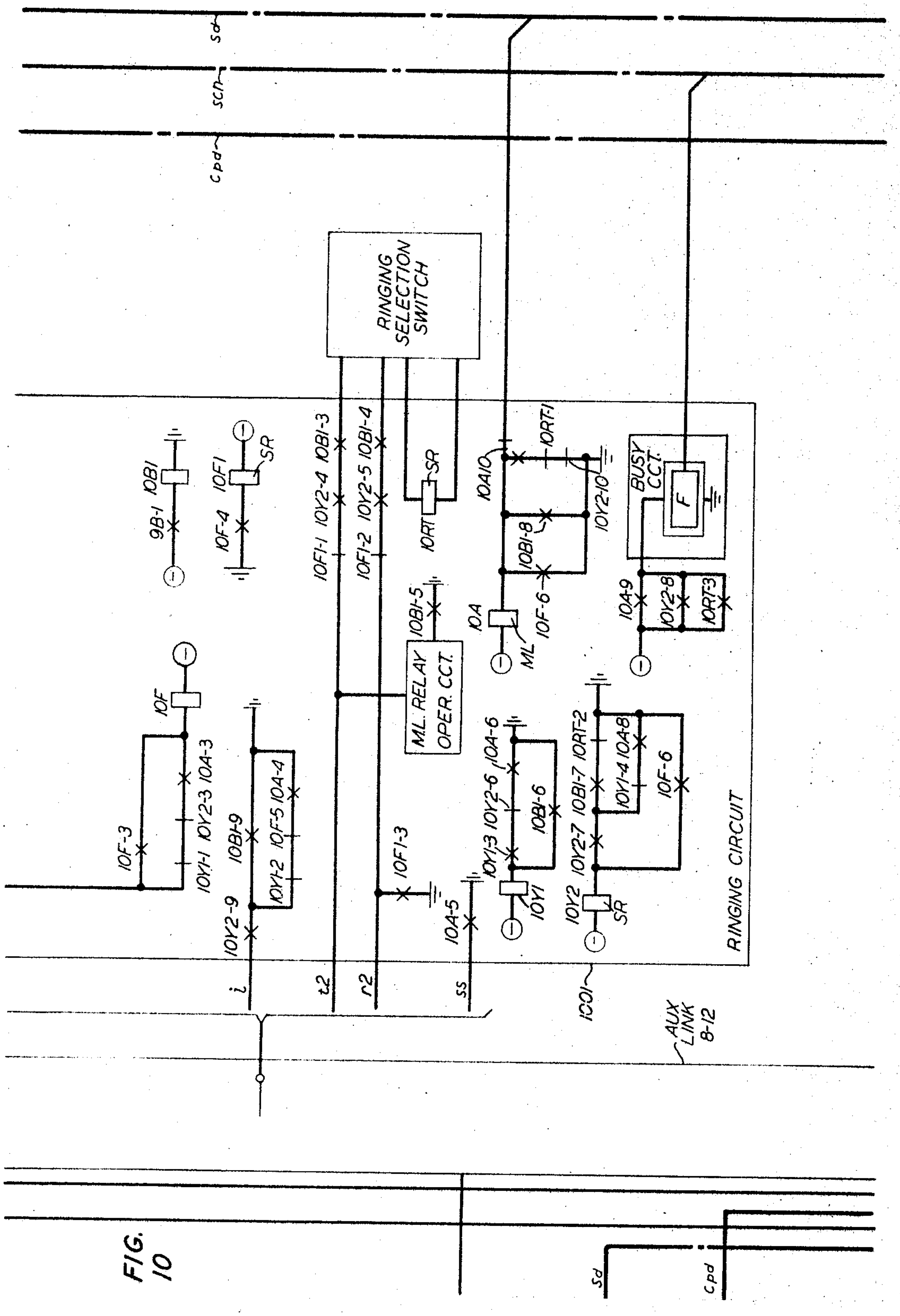
Figure 11:
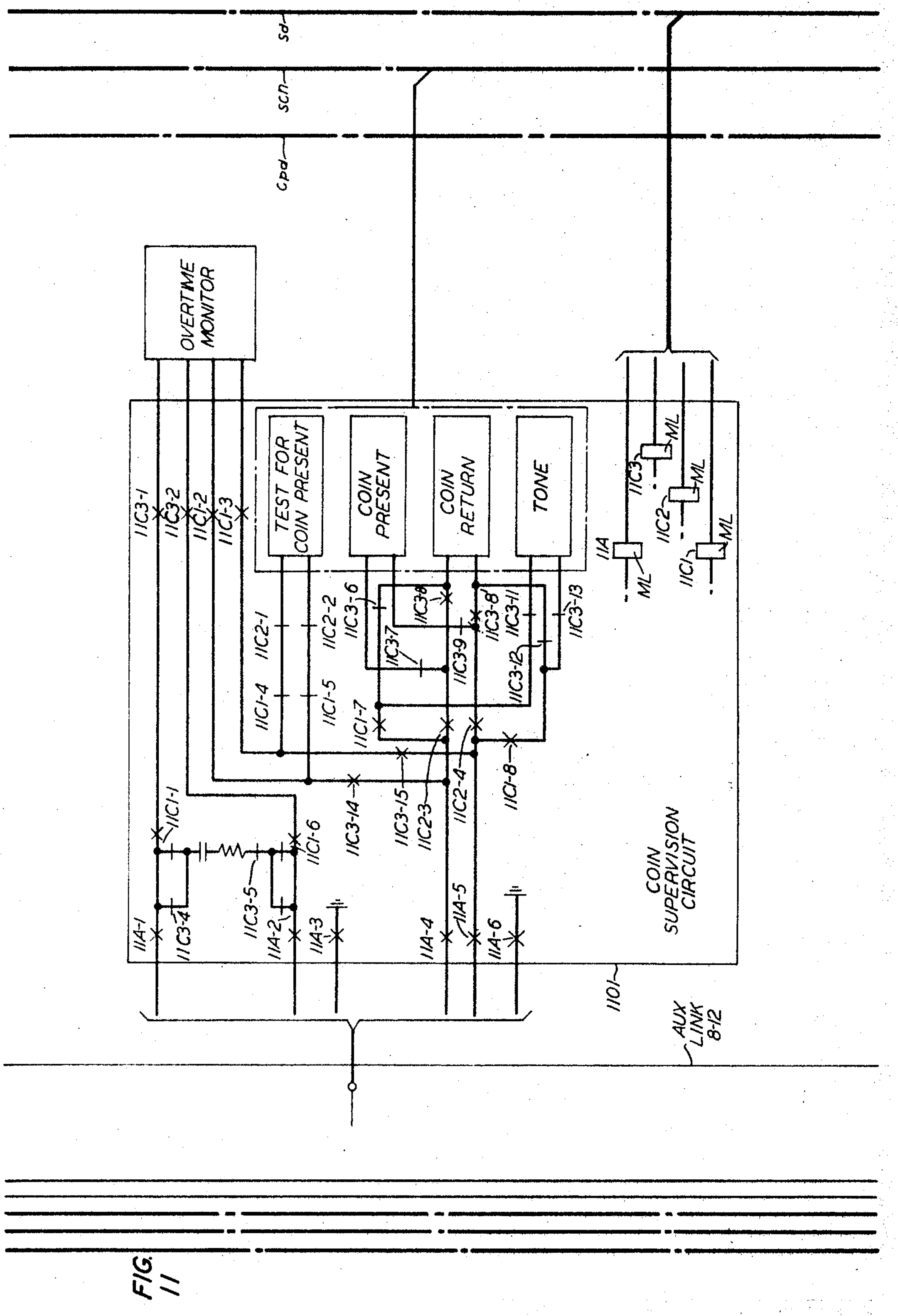

In FIG. 8, a cable tlf is shown from auxiliary link 8–12 which has an appearance in trunk link frame TLF1 (FIG. 2). This cable is utilized by the processor in the event that the marker was unable to find a channel available from the appearance of trunk 501 in trunk link frame TLF2. When the marker determines that no channels are available from trunk link frame TLF2, relay 4FM operates indicating a failure to match condition. A contact of the 4FM relay activates an associated scan point to inform the precessor of this condition. The processor then instructs auxiliary link controller 72 to establish a connection from trunk 501 to cable tlf in auxiliary link 8–12 via an incoming matching loss circuit on link 8–12 (not shown). The other end of cable tlf appears in trunk link frame TLF1 and the processor instructs the marker to attempt to find a linkage from this appearance to the called subscriber. In this manner the matching loss problem sometimes encountered in crossbar offices because of the limited number of junctures is alleviated without need of providing certain incoming trunks with dedicated appearances on different trunk link frames.

Tandem calls can be handled by the new type trunk circuits, such as 501, without requiring each trunk to have a dedicated line link frame appearance presently required on conventional tandem type trunks. A cable **11*f* similar to cable tlf is provided in FIG. 9. Cable 11*f* connects to an appearance in line link frame LLF2 (FIG. 2). When the processor determines that trunk 501 is handling a tandem class call, it instructs auxiliary link controller 72 to establish a connection from trunk 501 to cable 11*f*. The processor then instructs the completing marker to establish the outgoing connection from the line link frame appearance of cable 11*f*** to the outgoing trunk selected by decoding the called office code.

It is understood that the above-described arrangements are merely illustrative of the application of the principles of the invention. Numerous other arrangements may be devised by those skilled in the art without departing from the spirit and scope of the invention.

What is claimed is:

1. A telephone switching system having a plurality of crossbar trunk switch frames and markers for establishing communications channels thereto comprising a plurality of trunk circuits appearing in said frames, a plurality of service logic circuits selectively connectable to said trunks for providing individual logic functions thereto, processor means for preselecting one of said trunk circuits, means controlled by said processor means for connecting an appropriate one of said service logic circuits to said one of said trunk circuits, and means at said switch frames responsive to the connection of a service logic circuit to said one trunk circuit for enabling one of said markers to establish a communications channel thereto.

2. In a crossbar switching telephone system having a plurality of markers and a marker-controlled switching network, the improvement comprising an auxiliary link for connecting service circuits to control the transmission and supervisory states of the trunk circuits of said marker-controlled switching network, a stored program electronic processor, said processor:

(a) selecting in memory one of said trunk and one of said service circuits in accordance with a call processing program, (b) controlling said auxiliary link to interconnect said selected one of said trunk and service circuits, and (c) signaling one of said markers when linkage is to be set in said switching network; and means including said connected one of said trunk and service circuits for operating said signaled marker to establish said linkage.

3. In a crossbar switching telephone system according to claim 2, the combination wherein said link includes a plurality of trunk circuits appearing in different trunk link frames and wherein said processor establishes a connection through said link between said trunk circuits appearing in said different trunk link frames when no channels are available in one of said trunk link frames.

4. In a crossbar telephone switching system having a marker for translating call signaling information to determine the line and trunk link frame circuits between which a communications channel is to be established and for operating line and trunk link frame switches to establish the channel, the improvement comprising stored program processor means for translating call signaling information, a plurality of service logic circuits, means for furnishing said call signaling information to said processor instead of to said marker, means thereafter controlled by said processor for designating to said marker the line and trunk link frame circuits between which said marker is to establish said communications channel, and means responsive to said marker having established said channel for selectively connecting said service logic circuits with said trunk link frame circuit in said communications channel.

5. In a crossbar telephone switching system according to claim 4, the combination wherein said processor selects one of said service logic circuits in response to said translation of said call signaling information wherein said means for designating includes said selected one of said service logic circuits.

6. A telephone switching system comprising a switching network for providing communications channels between lines and trunks, a plurality of wire logic markers for operating said network, register means for obtaining call signaling information transmitted over said lines and trunks, said marker normally decoding said call signals information to ascertain the line or trunk group to which one of said channels is to be established, a plurality of simplified incoming and outgoing trunk circuits appearing in said network, a plurality of service logic circuits, an auxiliary switching network operable to connect said service logic circuits to provide individual logic functions to said simplified trunk circuits, means for scanning said simplified trunk circuits and said register means, and a stored program electronic processor connected with said scanning means, said processor (a) decoding said call signaling information to select an idle one of said simplified outgoing trunk circuits on outgoing calls and for ascertaining the called line identity for calls arriving over one of said simplified incoming trunk circuits, (b) selectively operating said auxiliary switching network to connect said service logic circuits with said simplified trunk circuits, and (c) selecting one of said markers to establish a communications channel to said trunk circuits connected with said logic circuits.

7. A telephone switching system according to claim 6 wherein said simplified trunk circuits include scanner elements for monitoring respective portions of said simplified trunk circuits transmission paths and wherein said auxiliary switching network includes separate connections to said logic circuits for said respective portions of said transmission paths.

8. A telephone switching system according to claim 7 wherein said processor selectively transmits signals to said service logic circuit connected with said simplified trunk circuits to control said respective portions of said simplified trunk circuits' transmission paths.

9. A marker-controlled crossbar telephone switch system having a marker which normally decodes call signaling information to obtain the identity of the terminals between which a communications switching channel is to be established and which then selects an idle channel to connect the said terminals characterized by a stored program electronic processor, means for furnishing said processor with said call signaling information to obtain the identity of the said terminals, means controlled by said processor for connecting to one of said terminals a service logic circuit to provide the logic function appropriate to the type of call being processed, and means for selecting a marker to complete the communications channel to the terminal having said service logic circuit attached.

References Cited

UNITED STATES PATENTS 3,324,248 6/1967 Seemann et al.

KATHLEEN H. CLAFFY, Primary Examiner

W. A. HELVESTINE, Assistant Examiner